(No Model.)

T. H. HOLMES.
METALLIC PACKING FOR STUFFING BOXES.

No. 500,899. Patented July 4, 1893.

Witnesses:
V. D. Goodwin
R. Schleicher

Inventor:
Thomas H. Holmes
by his Attorneys
Howson & Howson

UNITED STATES PATENT OFFICE.

THOMAS H. HOLMES, OF PHILADELPHIA, PENNSYLVANIA.

METALLIC PACKING FOR STUFFING-BOXES.

SPECIFICATION forming part of Letters Patent No. 500,899, dated July 4, 1893.

Application filed December 27, 1892. Serial No. 456,362. (No model.)

*To all whom it may concern:*

Be it known that I, THOMAS H. HOLMES, a subject of the Queen of Great Britain and Ireland, and a resident of Philadelphia, Pennsylvania, have invented certain Improvements in Metallic Packings for Stuffing-Boxes, of which the following is a specification.

The object of my invention is to so construct metallic packing for the piston rods of steam engines, pumps, &c., that it can be readily applied or removed, will occupy but little space and will form a steam tight bearing upon the rod and against the ends of the box or casing containing the packing rings, provision being also made for preventing any leakage of steam through the joints between the segments of the rings. This object I attain in the manner hereinafter set forth, reference being had to the accompanying drawings, in which—

Figure 1:
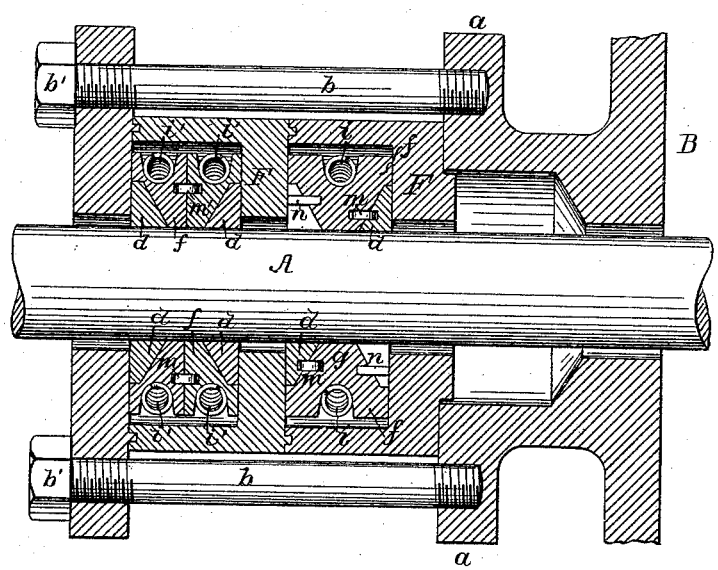
Figure 2:
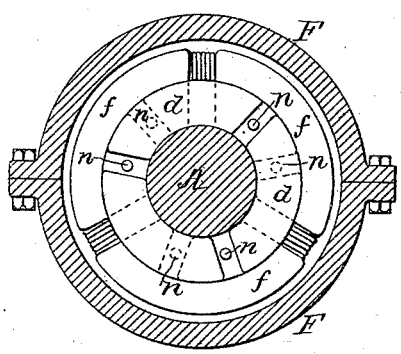
Figure 3:
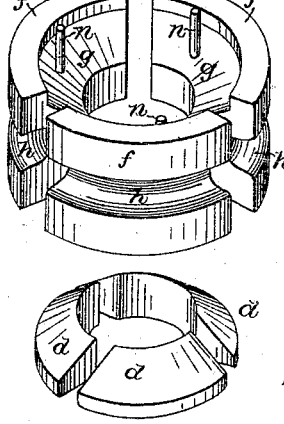
Figure 4:
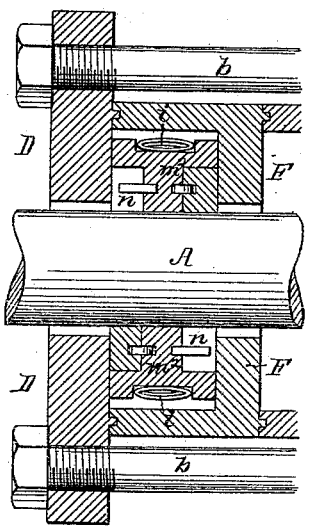

Figure 1, is a longitudinal section of a piston rod stuffing box having packing in accordance with my invention, two different forms of this packing being illustrated. Fig. 2, is a transverse section of the piston rod and stuffing box casing showing in elevation one set of packing rings surrounding the rod. Fig. 3, is a perspective view showing said set of packing rings detached from each other; and Fig. 4, is a longitudinal section showing another form of packing ring structure embodying my invention.

In Fig. 1, A represents part of the piston rod of a steam engine, pump, or other structure, and B part of the head of the cylinder, this head having the usual stuffing box casing with projecting flange $a$ to which is secured by means of bolts $b$ and nuts $b'$ a follower D, and between the latter and the flange of the stuffing box casing are confined one or more boxes or casings F each containing a series of packing rings, two of these boxes being shown in the present instance. The inner box contains three sets of rings, the outer rings of the set being composed of segments $d$ each flat on one side and beveled on the other and the intermediate rings being composed of segments $f$ each comprising a central projection $g$ beveled on each side and an outer flange with groove $h$, the beveled projection of each segment being adapted to act upon the beveled faces of the outer rings of the set and the groove $h$ in the flange of the intermediate ring being adapted for the reception of a coiled spring $i$ which extends around the ring and serves to press the segments of the same inward against the piston rod, while at the same time the beveled projections $g$ tend to force the segments of the outer rings not only against the piston rod but also against the walls of the confining box or casing, radial displacement of said segments of the outer rings being prevented by the overlapping flanges of the intermediate ring segments. Recesses in the segments $d$ and $f$ receive springs $m$ which tend to force the outer segments against the walls of the box or casing and thus aid the beveled faces of the engaging segments in the performance of this duty.

It will be observed on reference to Fig. 2 that the segments of the outer rings break joints with the segments of the intermediate ring so that any leakage of steam around the rings or along the piston rod through these joints is effectually prevented, and in order to permanently retain the parts in this relation to each other irrespective of any circumferential movement of the ring structure as a whole the segments $f$ of the intermediate ring have pins $m$ which project into the spaces between the segments $d$ of the outer rings and thus prevent any turning of one set of segments independently of the other. By thus locating the dowel pins I avoid any cutting of metal to form the opening for said pins.

The ring structure shown in the outer box F (Fig. 1) is substantially the same as that which I have just described with the exception that the intermediate ring is centrally divided, each half of each segment being grooved for the reception of an encircling spring $i'$, and the two halves of each segment being forced apart by means of springs $m'$ inserted in recesses in the meeting faces of the segments, as shown.

In the modification shown in Fig. 4 similar springs $m^2$ constitute the only means of forcing the rings apart, the shoulders formed by the rings being at right angles to each other so that the intermediate ring segments only serve to force the outer ring segments inward against the rod.

The boxes F are preferably made in halves, divided longitudinally, as shown in Fig. 2, so that they can be applied to or removed from a rod without necessitating the detaching of the same from the cross head, and the openings in the boxes as well as in the cylinder head and follower are somewhat larger in diameter than the piston rod so as to provide for vibration of the latter due to defective alignment of the engine, the packing rings sliding in the boxes in order to accommodate such vibration of the rod. The boxes with their rings can be readily adapted to the usual stuffing box projection on the cylinder head, and will not occupy more space than is often occupied by an ordinary stuffing box, the diameter of the boxes being kept down to the minimum owing to the fact that the encircling springs are let into grooves in the intermediate ring and do not project beyond the periphery of the same. But one set of segments $d$ and one set of segments $f$ may be used in the box in some cases, but the use of two sets of segments $d$ in combination with the intermediate set of segments $f$ is always to be preferred.

Having thus described my invention, I claim and desire to secure by Letters Patent—

1. The combination, in a stuffing box packing, of a box or casing, a series of rings, one overlapping another and each composed of a series of segments, with one or more encircling springs for pressing the rings into contact with the piston rod, and pins projecting from the segments of one ring into the spaces between the segments of the adjoining ring, so as to insure the breaking of joints and prevent the circumferential movement of one ring independently of the other, substantially as specified.

2. The combination, in the stuffing box packing, of a series of packing rings, each composed of segments, and the box or casing therefor, made in laterally separable sections, said box or casing being located wholly outside of the cylinder head or projecting boss, so that it may be applied to or removed from a rod without disturbing the latter, substantially as specified.

In testimony whereof I have signed my name to this specification in the presence of two subscribing witnesses.

THOMAS H. HOLMES.

Witnesses:
WILLIAM D. CONNER,
JOSEPH H. KLEIN.